Aug. 11, 1925.
J. N. DUNCAN
1,549,301
REVERSING CURRENT COLLECTOR
Filed Dec. 26, 1922
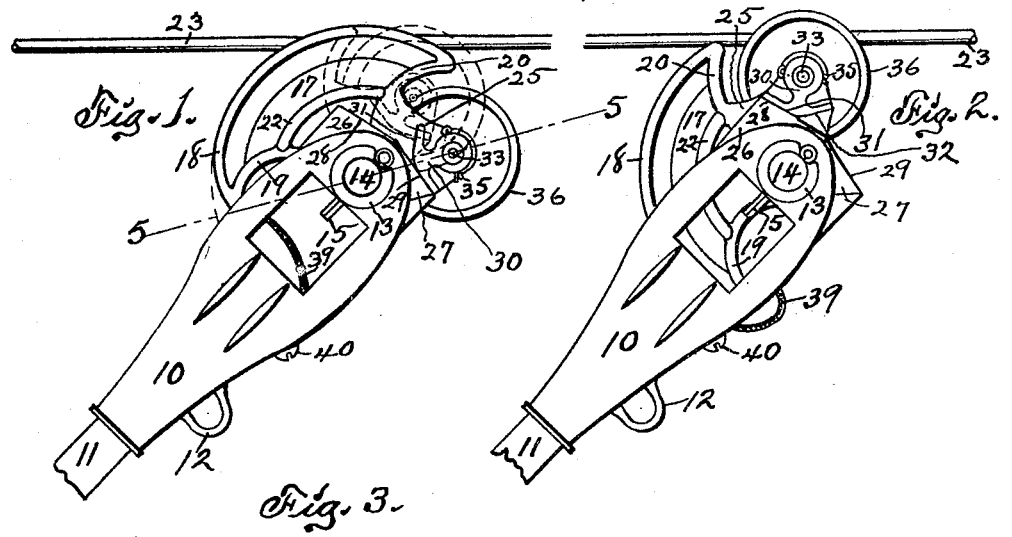
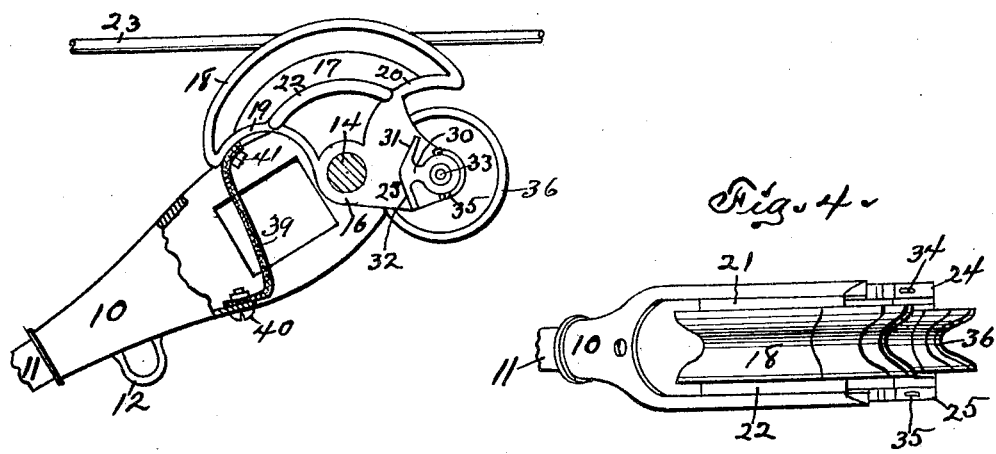
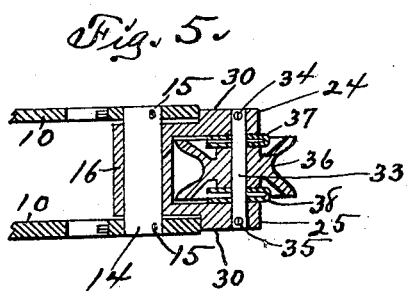
INVENTOR
John N. Duncan.
BY
Earl M. Sinclair
ATTORNEY Patented Aug. 11, 1925.

1,549,301

UNITED STATES PATENT OFFICE.

JOHN N. DUNCAN, OF BOONE, IOWA.

REVERSING CURRENT COLLECTOR.

Application filed December 26, 1922. Serial No. 608,879.

*To all whom it may concern:*

Be it known that I, JOHN N. DUNCAN, a citizen of the United States of America, and resident of Boone, Boone County, Iowa, have invented a new and useful Reversing Current Collector, of which the following is a specification.

The object of this invention is to provide an improved overhead trolley harp, shoe and wheel combined for electric railways and the like.

A further object of this invention is to provide means for carrying a shoe and wheel in an overhead trolley harp in such manner that during normal forward movement the shoe will collect current from an overhead conductor and during reverse or backing up movement the devices will tilt so as to bring the wheel into collecting contact with the conductor, there being a point in the tilting movement at which the conductor is in contact with and bridges the space between the shoe and wheel.

A further object of this invention is to provide a grooved current-collecting wheel normally in out-of-contact trailing relation to a current-collecting shoe, carried by a harp on an overhead trolley device, whereby during or upon the occurrence of any reverse or backing-up movement the wheel will automatically come into contact with an overhead conductor and roll thereon, thereby preventing buckling of the trolley pole or undue elevation of the conductor.

My invention consists in the construction, arrangement and combination of elements hereinafter set forth, pointed out in the claims and illustrated by the accompanying drawing, in which—

Figure 1 is a side elevation of my improved device in position for normal use in forward travel, dotted lines indicating positions assumed by certain of the parts near the beginning of reverse movement or travel showing the conductor in contact with and bridging the space between the shoe and wheel. Figure 2 is a similar view showing the positions assumed by the parts after reverse travel is established with the shoe out of contact and the wheel in contact with the conductor. Figure 3 is a similar view to Figure 1, a part of the harp being removed. Figure 4 is a plan of the device according to Figure 1. Figure 5 is a cross-section on the line 5—5 of Figure 1.

In the construction of the device as shown the numeral 10 designates generally a harp adapted to be carried on the upper end portion of a trolley pole 11 and provided with an eye 12 to which a trolley-rope may be attached for convenience in manipulation thereof. The arms of the harp are formed with substantially plane, parallel and opposed inner faces and outwardly-extending bosses 13 are formed on end portions of said arms and are apertured in register for the reception of a pivot 14, said pivot being secured therein by cotter keys 15 mounted transversely through said bosses and end portions of said pivot. A hub 16 is mounted for oscillation on the pivot 14 between the arms of the harp and a substantially segmental arm 17 is formed on and extends radially from said hub. An arcuate grooved rim 18 is formed on the outer end of the arm 17 and the groove thereof is substantially concentric with the pivot 14. The grooved rim 18 is substantially wider than the thickness of the arm 17 and is further joined thereto and to the hub 16 by substantially radial ribs 19, 20. The arm 17 projects beyond the upper margins of the arms of the harp and the grooved rim 18 normally is laterally removed above said arms and yet it is of such thickness that it may enter at times the space between said harp arms as shown in Figure 2. The arm 17 also is formed with laterally-extending arcuate shields or ribs 21, 22 joined at their ends to the ribs 19, 20 and adapted to bridge the spaces between the sides of the arm and the adjacent inner faces of the arms of the harp and prevent entrance of an extraneous object, such as a conductor 23, between them. Ears 24, 25 are formed on and extend radially from the hub 16 parallel with each other and said ears are spaced apart slightly less than the spacing apart of the arms of the harp; the median radial lines of the ears being substantially at right angles to the median radial line of the arm 17. The arms of the harp 10 are formed with rounded extremities and angular projections 26, 27, are formed thereon, said projections having inclined faces 28, 29 intersecting substantially on the median lines of said arms and constituting the extreme end margins thereof. Lugs 30 are formed on and project laterally from the outer faces of the ears 24, 25, and each lug is formed with inclined end faces 31, 32 intersecting substantially on the median line of the lug.

The inclined end faces of the lugs 30 are opposed to the inclined end faces 28, 29 and are adapted respectively to contact therewith and limit and determine oscillation of the hub 16 on the pivot 14. The ears 24, 25 also connect integrally with the ribs 20. Registering holes are formed in the outer ends of the ears 24, 25 and an axle 33 is mounted therein and secured by cotter keys 34, 35. A grooved trolley-wheel 36 of materially less radius than the arm 17, is mounted for rotation on the axle 33 between the ears 24, 25 and the periphery of said wheel is spaced slightly from the rear end of the grooved rim 18, and is overlapped thereby substantially one quarter of its circumference. It will be observed that the hub, arm, rim, ears, ribs and lugs are homogeneous or integral, preferably being formed in one piece by molding and that the grooved wheel is intimately related thereto, the whole constituting a dual-current-collecting device combining sliding and rolling functions.

The device is employed as shown in Figures 1, 2 and 3; in Figures 1 and 3 to collect current from the conductor 23 by sliding contact therewith during rest or forward movement of a vehicle carrying the pole 11; and in Figure 2 to collect current by rolling contact from said conductor during maintained reverse travel of said vehicle. Were it not for the provision of the rolling-contact member or wheel 36, there would be a tendency of the grooved rim 18 to stick to the conductor 23 and not slip or slide thereon when the vehicle is reversed, resulting in an undue elevation of the conductor and trolley and a buckling of the pole. In the use of the device as shown, however, the sliding member turns forwardly on the pivot 14 and brings the wheel into contact with the conductor, after which and during further and maintained reverse travel of the vehicle the wheel alone contacts with and collects current from the conductor. The combined current-collecting device is nicely balanced on the pivot 14, so that vibration of the harp longitudinally of the conductor automatically alternates the contacts of the rim or shoe and wheel with said conductor. Also, intermediate of the vibrations of the combined device, there is a point at which both the rim 18 and wheel 36 are momentarily in contact with the conductor, whereby the conductor bridges the space between said rim and wheel and insures continuous passage of current thereto.

Folded resilient metal washers 37, 38 (Fig. 5) are mounted on the axle 33 between the ears 24, 25 and the ends of the hub of the wheel 36 to insure even running of the wheel and good electrical contact from the wheel to the ears. A shunt member 39, preferably made of braided copper wires and flexible in character, is arranged within the harp and is fixed at one end by a screw 40 to the body of the harp and at the other end by a screw 41 to the forward end of the grooved rim 18. The shunt member 39 will buckle, bend and flex readily during vibrations of the current-collecting device and provide a constant and good conductor between said device and the harp.

I claim as my invention—

1. A trolley comprising a harp, a hub pivoted therein, a grooved segment formed on said hub and electrically connected to said harp, ears on said hub and a grooved wheel pivoted to said ears and electrically connected to said hub, said wheel being spaced from one end portion of said grooved segment and capable of rotating freely in either direction.

2. In a trolley device having a harp, a dual current-collecting device mounted for vibration on and electrically connected to said harp and comprising a grooved segment, ears substantially at right angles to said segment, and a grooved wheel pivoted in said ears and spaced from said segment and capable of rotating freely in either direction.

3. In a trolley device having a harp, a sliding current-collecting device mounted for oscillation in and electrically connected to said harp, and a rolling current-collecting device carried by the sliding device, spaced therefrom and capable of rotating freely in either direction and electrically connected thereto.

4. In a trolley device, a harp having the end portions of its arms formed with intersecting inclined faces, and a current collecting device mounted for oscillation between said arms and formed with lateral lugs having intersecting inclined faces adapted for alternate contact with the intersecting inclined end faces of the arms.

5. In a structure of the character described, a trolley harp, a shoe pivoted therein intermediate its ends, and a trolley wheel pivoted in one end of the shoe and capable of rotating freely in either direction.

6. In a trolley device, a dual current-collecting device comprising a sliding member and a rolling member spaced apart and electrically connected, said current-collecting device being adapted to be positioned so that a conductor bridges the space between the sliding and rolling members, said rolling member being capable of rotating freely in either direction.

Signed at Boone, in the county of Boone and State of Iowa, this 16th day of October, 1922.

JOHN N. DUNCAN.